United States Patent
Ting et al.

(10) Patent No.: US 7,283,170 B2
(45) Date of Patent: Oct. 16, 2007

(54) INTELLIGENT BUTTON FEATURE IN DIGITAL IMAGE ACQUISITION APPARATUS AND MODE SWITCHING METHOD OF THE SAME

(75) Inventors: Chou Yi Ting, Taoyuan (TW); Li-Min Tseng, Taoyuan (TW)

(73) Assignee: Benq Corporation, Taoyuan (TW)

( * ) Notice: Subject to any disclaimer, the term of this patent is extended or adjusted under 35 U.S.C. 154(b) by 734 days.

(21) Appl. No.: 10/835,975

(22) Filed: Apr. 29, 2004

(65) Prior Publication Data

US 2004/0218054 A1   Nov. 4, 2004

(30) Foreign Application Priority Data

Apr. 30, 2003   (TW) ............................... 92110214 A

(51) Int. Cl.
 *H04N 5/222* (2006.01)
(52) U.S. Cl. ............................... 348/333.01; 348/220.1
(58) Field of Classification Search ............. 348/211.6, 348/207.99, 220.1, 333.01
 See application file for complete search history.

(56) References Cited

U.S. PATENT DOCUMENTS

2003/0112340 A1*   6/2003   Okada et al. ............. 348/220.1
2004/0061788 A1*   4/2004   Bateman .................. 348/220.1

FOREIGN PATENT DOCUMENTS

JP   2001-245189   9/2001

* cited by examiner

*Primary Examiner*—Ngoc-Yen Vu
*Assistant Examiner*—Christopher K Peterson
(74) *Attorney, Agent, or Firm*—Birch, Stewart, Kolasch & Birch, LLP

(57) ABSTRACT

The invention provides a mode switching method in a digital image acquisition apparatus with a first button for taking pictures and a second button for mode switching. Snapshot modes and a viewing mode are provided. A snapshot parameter is for recording whether the apparatus is currently used for taking pictures. Each time when the apparatus is used for taking pictures via the first button, the snapshot parameter is recorded as a snapshot status. A mode parameter is for recording which mode the apparatus is currently situated. Each time when the apparatus is used for mode switching via the second button, the mode parameter is recorded as a corresponding mode status. When the apparatus performs mode switching via the second button, if the snapshot parameter is at the same time recorded as the snapshot status, the apparatus is switched directly to the viewing mode in irrespective to its original snapshot mode.

17 Claims, 5 Drawing Sheets

INTELLIGENT BUTTON FEATURE IN DIGITAL IMAGE ACQUISITION APPARATUS AND MODE SWITCHING METHOD OF THE SAME

BACKGROUND OF THE INVENTION

1. Field of the Invention

This present invention relates to a mode switching method in a digital image acquisition apparatus. It is particularly relates to a method of fast mode switching in a digital image acquisition apparatus, e.g. digital camera, digital video camera and other digital products alike.

2. Description of the Prior Art

Digital products, such as digital image acquisition apparatus, have been developed with the trend towards smaller size, more elegant outfit and more functions. A conventional digital image acquisition apparatus, such as digital camera, mainly comprises elements including a photoelectric device, a LCD (liquid crystal display) screen, a memory module, and buttons. The size of the digital camera is dependent on the sizes of these elements. Because basic settings of the digital camera become more complicated, the number of buttons is increased relatively.

Basic functional buttons of a conventional digital camera include buttons for mode (knob), up, down, left, right, OK, and snapshot, etc. The conventional digital cameras require many buttons and operation steps to switch modes. It is not convenient and not user-friendly. As digital cameras become smaller and more elegant, more patents emphasize on reducing button structures. However, the operation of the digital camera is still not convenient.

Therefore, a primary objective of the present invention is to provide a mode switching method in a digital image acquisition apparatus to reduce buttons and operation steps of the apparatus, to perform functions. For example, a view mode can be directly reached to browse pictures that have just been taken by the user without actuating buttons for many times, so as to save user's operation time and prevent the inconvenience.

SUMMARY OF THE INVENTION

Accordingly, an objective of the invention is to provide a mode switching method in a digital image acquisition apparatus. Users can use less buttons to achieve lots functions of the apparatus in less operation time.

The digital image acquisition apparatus according to the present invention comprises at least a first button for taking picture, and a second button for mode switching. In a mode switching method according to the present invention, a plurality of snapshot modes and a viewing mode are provided. A snapshot parameter is provided for recording whether the digital image acquisition apparatus is currently utilized for taking pictures. Each time when the digital image acquisition apparatus is utilized for taking pictures via the first button, the snapshot parameter is recorded as a snapshot status. A mode parameter is provided for recording which mode the digital image acquisition apparatus is currently situated. Each time when the digital image acquisition apparatus is utilized for mode switching via the second button, the mode parameter is recorded as a corresponding mode status. When the digital image acquisition apparatus performs mode switching via the second button, if the snapshot parameter is at the same time recorded as the snapshot status, the digital image acquisition apparatus is switched, in irrespective to the original snapshot mode and directly to the viewing mode.

The mode switching method in the digital image acquisition apparatus according to the present invention, considering common user behaviors, can be used for fast mode switching. The user can operate the apparatus, e.g. digital camera, without complicated steps in less operation time. Besides, the present invention can reduce the number of buttons in the digital image acquisition apparatus to further decrease manufacturing costs.

The advantage and spirit of the invention may be understood by the following recitations together with the appended drawings.

BRIEF DESCRIPTION OF THE APPENDED DRAWINGS

DETAILED DESCRIPTION OF THE INVENTION

The present invention provides a mode switching method in a digital image acquisition apparatus. The digital image acquisition apparatus refers to all kinds of digital product that has an image acquisition module and an image display module. Those digital products include but not limited to digital camera and digital video camera. In other words, for all kinds of digital products that have image acquisition ability and users want to in time browse the acquired image, the mode switching method of the present invention may be applied to save user's operation time and eliminate inconvenience due to complicated user interface. By using a digital camera as an example, followings describe the mode switching method and the related apparatus according to the present invention.

Figure 1:
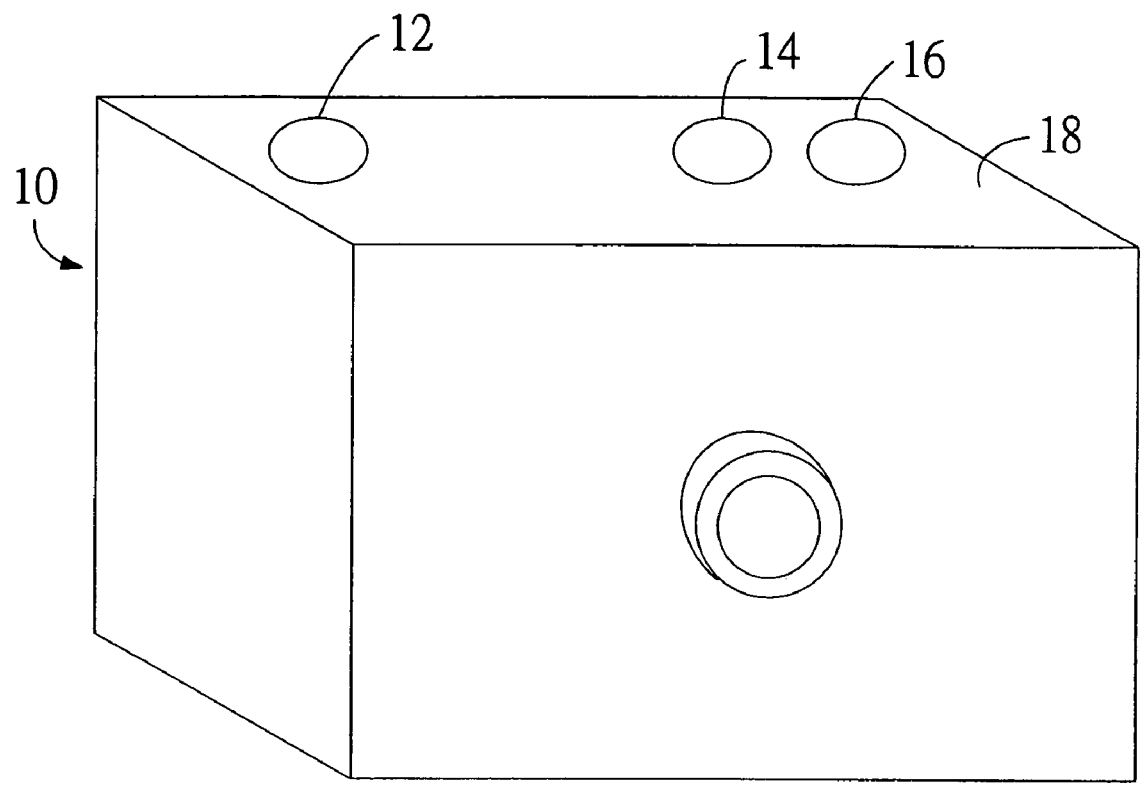
FIG. 1 is a schematic diagram of a digital camera for fast mode switching according to the present invention.
Figure 2:
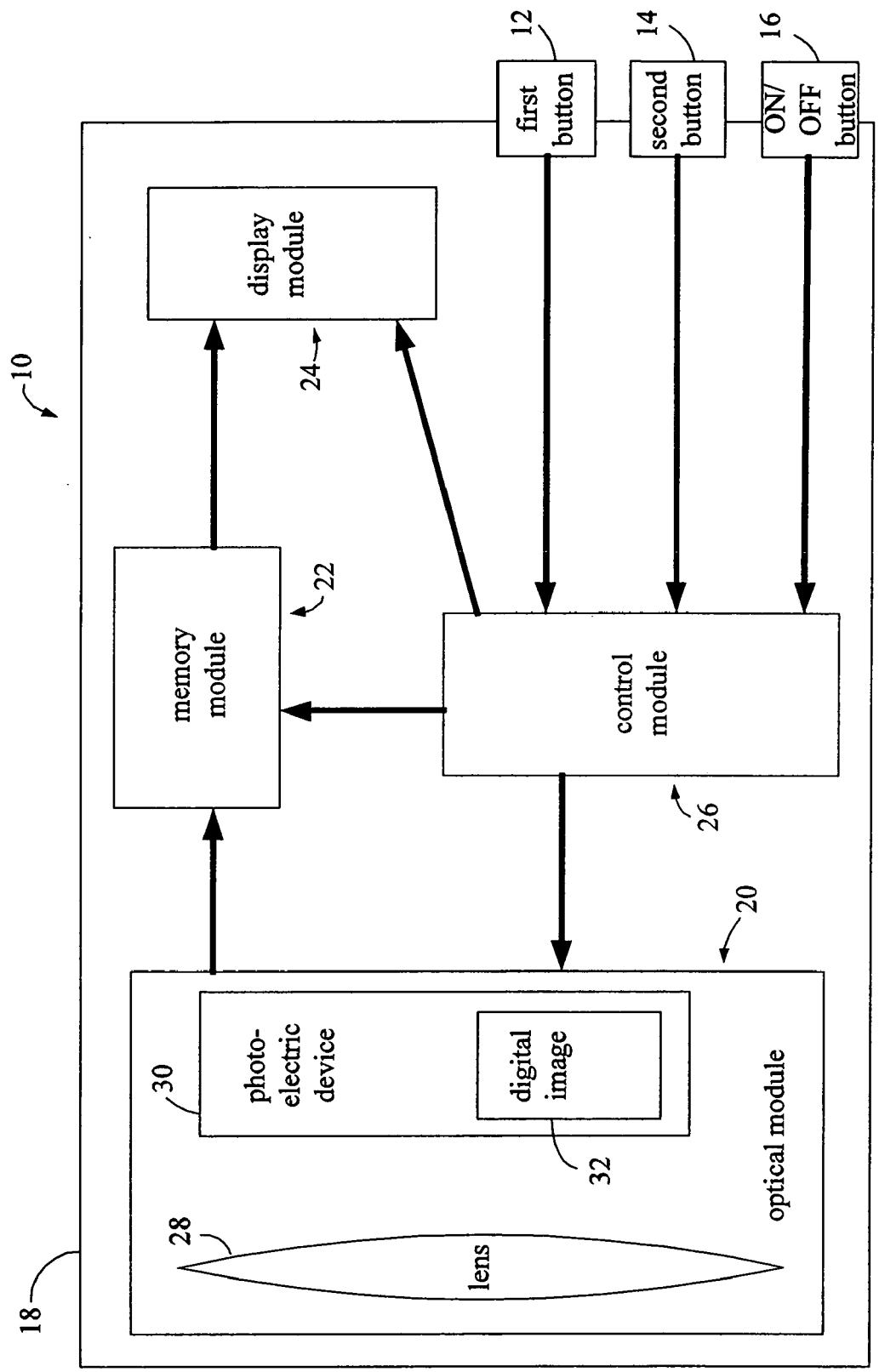
FIG. 2 is a functional block diagram of the digital camera shown in FIG. 1.

Please refer to FIG. 1 and FIG. 2. FIG. 1 is a schematic diagram of a digital camera 10 for fast mode switching according to the present invention. FIG. 2 is a functional block diagram of the digital camera 10 shown in FIG. 1. As shown in FIG. 1, in an embodiment according to the present invention, a digital camera 10 for fast mode switching can perform a picture taking function in responsive to a first action, and perform a mode switching function in responsive to a second action. In a preferred embodiment, the digital camera 10 comprises a first button 12, a second button 14, an ON/OFF button 16, and a housing 18. A user can take the first action to press the first button 12, or take the second action to press the second button 14. The first button 12 is for user to take pictures, and then performs the picture taking function. The second button 14 is for user to conduct mode switching, and then performs the mode switching function. The ON/OFF button 16 is for user to turn on or off the digital camera 10, so-called power button. The housing 18 is for accommodating elements of the digital camera 10.

As shown in FIG. 2, the digital camera 10 also comprises an optical module 20, a memory module 22, a display module 24, and a control module 26. The optical module 20 comprises a lens 28 and a photoelectric device 30, to generate a digital image 32. The memory module 22, e.g. built-in memory or external memory card, is for storing the digital image 32. The display module 24, e.g. LCD screen, is for displaying the digital image 32, so as to enable the user to view the image. The control module 26 is for controlling the optical module 20, the memory module 22, and the display module 24. The housing 18 accommodates the optical module 20, the memory module 22, the display module 24, and the control module 26. The housing 18 comprises the first button 12 for taking pictures, the second button 14 for mode switching, and the ON/OFF button 16 for turning on or off the digital camera 10.

When the ON/OFF button 16 is actuated, the control module 26 turns on or off the digital camera 10 according to the signal transmitted from the ON/OFF button 16. When the ON/OFF button 16 is ON, if the first button 12 is actuated, the control module 26 controls the optical module 20 to snapshot according to the signal transmitted from the first button 12. When snapshot is finished, the photoelectric device 30 generates a digital image 32 and allows the digital image 32 to be stored in the memory module 22. When the user wants to view the digital image 32, the digital image 32 will be transmitted to the display module 24 for the user to view the digital image 32.

When the second button 14 is actuated, it means that the user wants to switch modes provided by the digital camera 10. Therefore, the control module 26 will switch modes according to the signal transmitted from the second button 14, and display modes on the display module 24.

Figure 3:
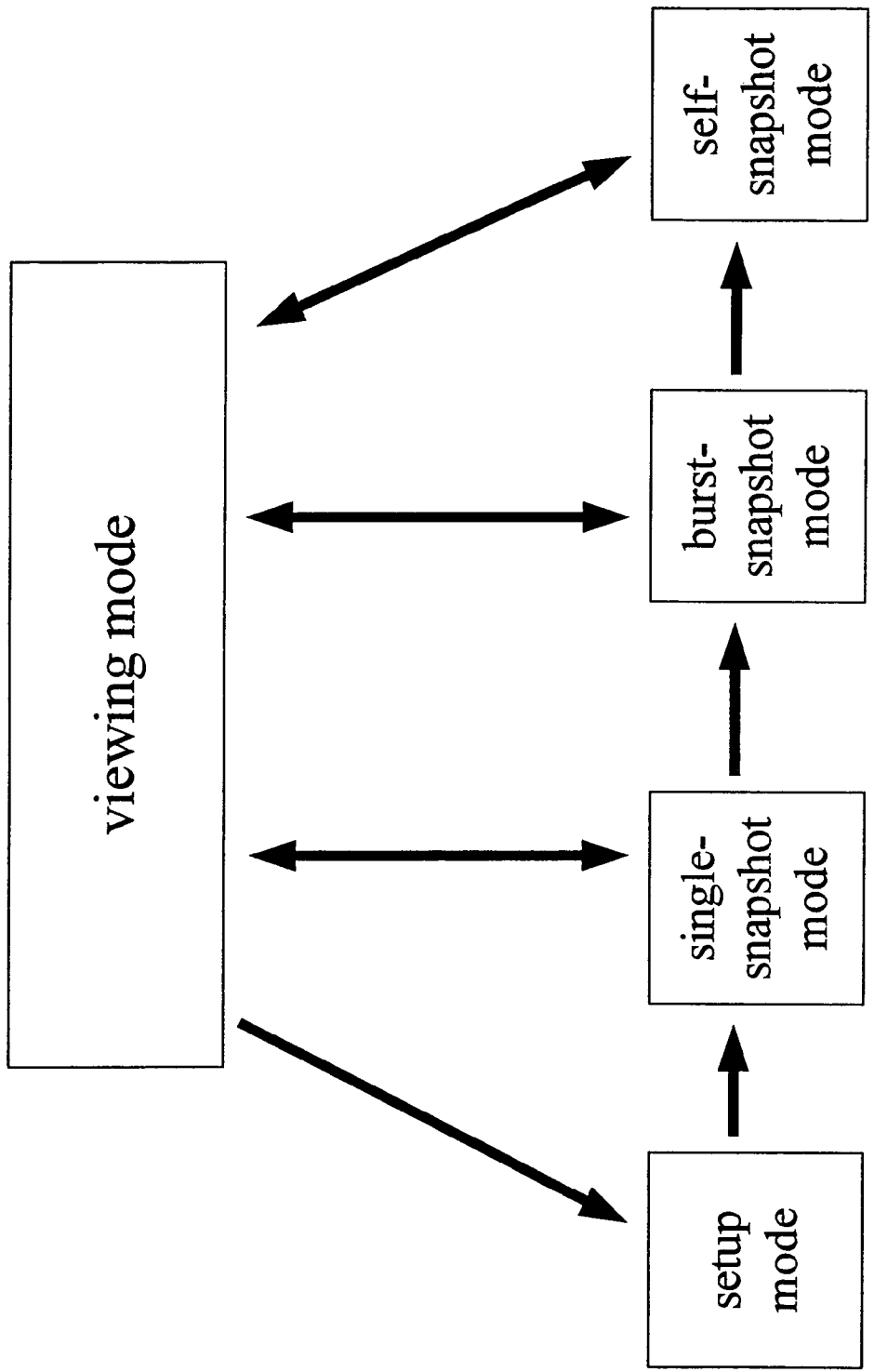
FIG. 3 is a schematic diagram of mode switching by the control module mode shown in FIG. 2.

Please refer to FIG. 3. FIG. 3 is a schematic diagram of mode switching by the control module 26 shown in FIG. 2. Followings describe mode switching by the control module 26 when the second button 14 is actuated. The control module 26 provides a plurality of snapshot modes, a viewing mode and a setup mode. The snapshot mode comprises a single-snapshot mode, a burst-snapshot mode, and a self-snapshot mode, for the user to choose according to user needs. The single-snapshot mode means that the control module 26 will control the optical module 20 to snapshot one time when the user actuates the first button 12. The burst-snapshot mode means that the control module 26 will control the optical module 20 to snapshot continuously for many times, e.g. for three snapshots, when the user actuates the first button 12. The self-snapshot mode means that the control module 26 will delay the snapshot of the optical module 20 when the user actuates the first button 12, to provide enough time for the user returning in front of the lens to include himself in the picture taken. The viewing mode is for the user to view the digital image 32. The viewing mode, in particular, is for the user to view the image quality right after the user takes pictures with different snapshot modes. The setup mode is for setting up different modes, such as resolution, contrast, hue, color/monochrome switch, etc., so as to enable the digital camera to perform different setup functions.

In order to provide fast mode switching as an objective of the present invention, the control module 26 according to the present invention provides a snapshot parameter and a mode parameter, for recording the current status of the digital camera 10. The snapshot parameter is for recording whether the digital camera 10 is currently utilized for taking pictures. The default snapshot parameter as the digital camera 10 is switched on can be set as "no" or "un-snapshot status". Each time when the digital camera 10 is utilized for taking pictures via the first button 12, the snapshot parameter is recorded as "yes" or "snapshot status" no matter using which snapshot mode to take pictures. If the digital camera 10 does not snapshot via the first button 12 or not switch mode via the second button 14 after a predetermined time (e.g. three minutes), the snapshot parameter will be reset to "un-snapshot status", the default snapshot parameter.

The mode parameter is for recording which mode the digital camera 10 is currently situated. Each time when the digital camera 10 is utilized for snapshot via the first button 12, the mode parameter is recorded as a snapshot status. Each time when the digital camera 10 is utilized for mode switching via the second button 14, the mode parameter is recorded as a corresponding mode status. Therefore, the mode status of the mode parameter can be a single-snapshot status, a burst-snapshot status, a self-snapshot status, a viewing status or a setup status.

The snapshot parameter and the mode parameter are stored in the buffer of the control module 26. The control module 26 can know the current status of the digital camera 10 by these parameters. Each different status of the parameters can be represented by using different codes. For example, the snapshot parameter can be "yes" (snapshot status) or "no" (un-snapshot status), and the mode parameter can be "single-snapshot status", "burst-snapshot status", "self-snapshot status", "viewing status" or "setup status". The applications are not limited to these examples.

Figure 4:
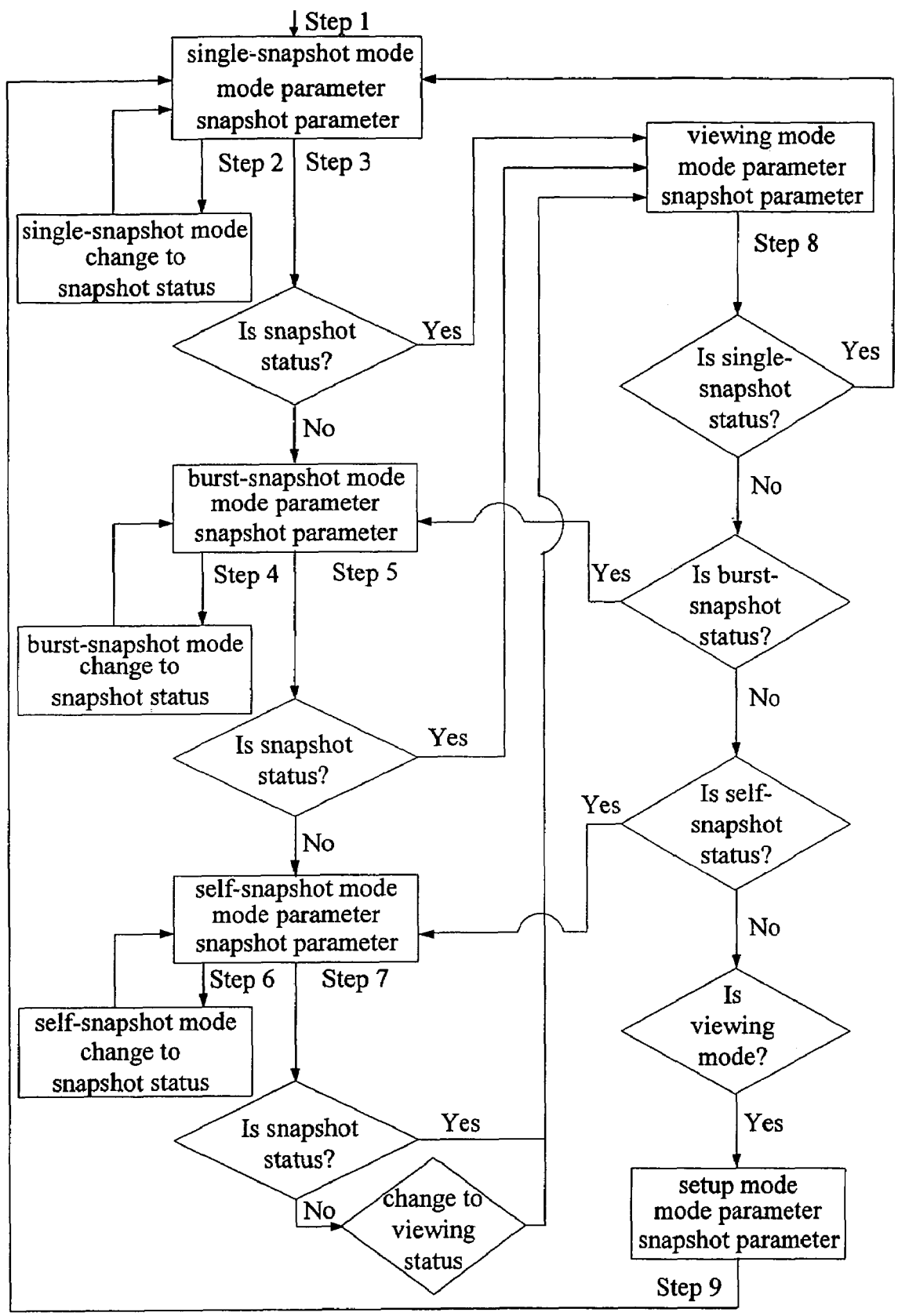
FIG. 4 is a flow chart of the mode switching method in FIG. 3.

Please refer to FIG. 4. FIG. 4 is a flow chart of the mode switching method in FIG. 3. Followings describe the flow and method of the control module 26 using the snapshot parameter and the mode parameter to switch modes. In FIG. 4, the descriptions in rectangle blocks mean the modes of the digital camera 10, and the descriptions in rhombus blocks mean the decision steps of the control module 26. Steps from 1 to 9 are user's operations while switching modes. Nevertheless, it is not necessary for the user to continuously perform these operations.

Step 1: The user turns on the digital camera 10. First enter the single-snapshot mode. The default mode parameter is "single-snapshot status", and the default snapshot parameter is "un-snapshot status".

Step 2: The user actuates the first button 12 for taking pictures under the single-snapshot mode. Therefore, the snapshot parameter is changed to "snapshot status". The mode parameter is not changed, still is "single-snapshot status".

Step 3: When wishing to enter other mode, the user actuates the second button 14 for mode switching in order to leave the single-snapshot mode. The control module 26 determines according to the snapshot parameter. If the snapshot parameter is "snapshot status", automatically enter the viewing mode. If the snapshot parameter is "un-snapshot status", automatically enter to the burst-snapshot mode. When enter the burst-snapshot mode, the mode parameter is set as "burst-snapshot status", but the snapshot parameter is not changed. The snapshot parameter is still "un-snapshot status".

Step 4: The user actuates the first button 12 for taking pictures under the burst-snapshot mode. The snapshot parameter is changed to "snapshot status". The mode parameter is not changed, and is still "burst-snapshot status".

Step 5: When wishing to enter other mode, the user actuates the second button 14 to leave the burst-snapshot mode. The control module 26 determines according to the snapshot parameter. If the snapshot parameter is "snapshot status", automatically enter the viewing mode. If the snapshot parameter is "un-snapshot status", automatically enter the self-snapshot mode. When enter the self-snapshot mode, the mode parameter is set as "self-snapshot status", but the snapshot parameter is not changed, and is still "un-snapshot status".

Step 6: The user actuates the first button 12 for taking pictures under the self-snapshot mode. The snapshot parameter is changed to "snapshot status". The mode parameter is not changed, and is still "self-snapshot status".

Step 7: When wishing to enter other mode, the user actuates the second button 14 to leave the self-snapshot mode. The control module 26 determines according to the snapshot parameter. If the snapshot parameter is "snapshot status", automatically enter the viewing mode. If the snapshot parameter is "un-snapshot status", the mode parameter will be changed to the "viewing status". And enter the viewing mode. In other words, when entering the viewing mode, the mode parameter is set as "viewing status", and the snapshot parameter is set as "un-snapshot status".

Step 8: The user has already viewed the pictures by using the viewing mode. The user actuates the second button 14 to leave the viewing mode. The control module 26 determines according to the mode parameter. If the mode parameter is "single-snapshot status", meaning that the digital camera 10 is in single-snapshot mode before entering the viewing mode, then jump back to the single-snapshot mode. If the mode parameter is "burst-snapshot status", meaning that the digital camera 10 is in burst-snapshot mode before entering the viewing mode, then jump back to the burst-snapshot mode. If the mode parameter is "self-snapshot status", meaning that the digital camera 10 is in self-snapshot mode before entering the viewing mode, then jump back to the self-snapshot mode. If the mode parameter is "viewing status", it means that the digital camera 10 does not take any snapshot under the single-snapshot status, burst-snapshot status, or self-snapshot status before entering the viewing mode, and that the digital camera 10 has only been switched modes. Then the digital camera 10 enters the setup mode. When entering the setup mode, the mode parameter is set as "setup status", and the snapshot parameter is not changed, and is still "un-snapshot status".

Step 9: The user actuates the second button 14 to leaves the setup mode. Return to the single-snapshot mode.

In the above mode switching method according to the present invention, when the digital camera 10 performs mode switching via the second button 14, if the snapshot parameter provided by the control module 26 is at the same time recorded as the snapshot status, the digital camera 10 is switched, in irrespective to the original snapshot mode and without entering into other snapshot modes, directly to the viewing mode. Moreover, when the digital camera 10 is in the viewing mode and the second button 14 is actuated for mode switching, the digital camera 10 switches back to the previous snapshot mode according to the recorded mode status of the mode parameter after finishing viewing, and continues to take pictures in this original snapshot mode.

This mode switching method is user-friendly, considering user behaviors. In other words, such mode switching is designed according to the observation for common user behaviors. Usually when taking pictures by using the digital camera, the user wants to see the image quality immediately. Therefore when actuating the second button 14 for mode switching after taking pictures, the user usually wants to switch into the viewing mode to view pictures. And then when actuating the second button 14 again for mode switching after viewing pictures, the user usually wants to switch back to the snapshot mode to continue taking pictures. The mode switching method according to the invention is base on such user behaviors. Therefore, only one button enable switch several modes, so as to reduce the number of the buttons of the digital camera.

When the digital camera is power-on, the default snapshot parameter is "un-snapshot status". If there is no snapshot under the default snapshot mode (e.g. single-snapshot mode in the embodiment), the snapshot parameter remains "un-snapshot status". In such situation, when the second button 14 is actuated, the digital camera 10 switches mode to another snapshot mode, for example, burst-snapshot mode or self-snapshot mode. When the digital camera performs mode switching in all snapshot modes, only if the snapshot parameter remains in the "un-snapshot status", then the digital camera 10 finally switches to un-snapshot mode such as "viewing mode" or "setup mode".

Figure 5:
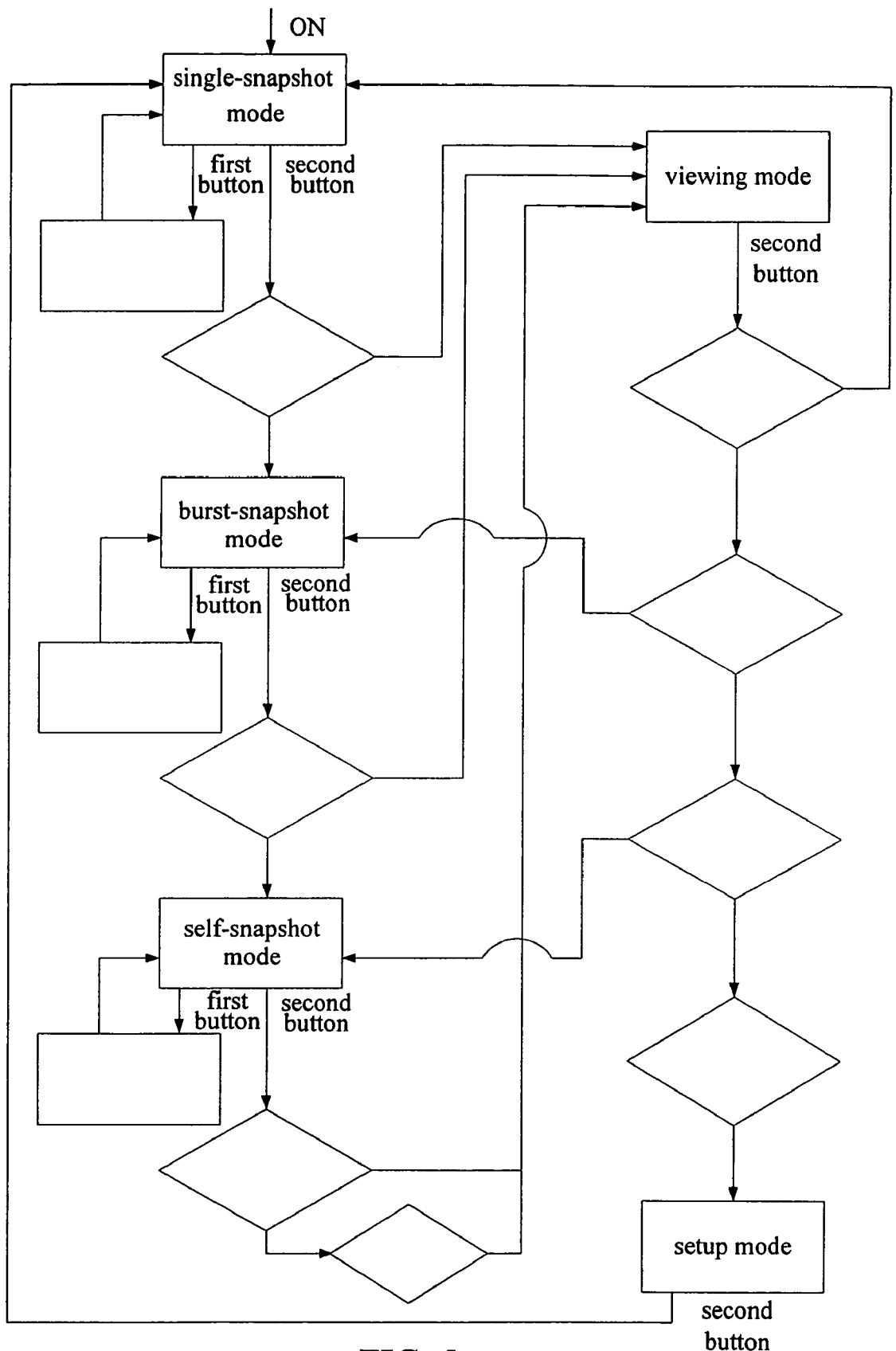
FIG. 5 is a flow chart of the mode switching process for a user according to the present invention.

Please refer to FIG. 5. FIG. 5 is a flow chart of the mode switching process for a user according to the present invention. In FIG. 5, the rectangle blocks with descriptions indicate the modes of the digital camera 10, and the blank rhombus blocks represent the decision steps of the control module 26. The blank rectangle blocks represent that the snapshot parameter is changed under the same mode. FIG. 5 is particularly corresponding to FIG. 4 and the blank rhombus blocks and the blank rectangle blocks represent the steps not seen by the user but relating to the control module 26. When using the digital camera 10, the user does not see the decision steps relating to the control module 26. Therefore, it is very easy to operate the digital camera for a user. When the user turns on the apparatus, the default snapshot parameter is set "un-snapshot status", and the default mode parameter is set "single-snapshot status". First enter the single-snapshot mode. When in single-snapshot mode, the user only needs to actuate the first button 12 for taking pictures, or to actuate the second button 14 for switching modes. When in burst-snapshot mode, the user only needs to actuate the first button 12 for taking pictures, or to actuate the second button 14 for switching modes. When in self-snapshot mode, the user only needs to actuate the first button 12 for taking pictures, or to actuate the second button 14 for switching modes. When in viewing mode, the user only needs to actuate the second button 14 for switching modes. Therefore, no matter in single-snapshot mode, burst-snapshot mode, self-snapshot mode, or viewing mode, the user only needs to actuate two buttons at most to snapshot or switch modes. The number of buttons can be reduced. Also, the operation steps are simplified.

Besides, in the mode switching method according to the present invention, snapshot modes provided by the control module 26 are not limited to single-snapshot mode, burst-snapshot mode, and self-snapshot mode. The settings can be designed with more or less modes, and to switch modes with different orders. Besides, it is not necessary to directly enter the single-snapshot mode when turning on the power. The settings can be designed to firstly enter any mode when turning on the power.

The mode switching method in the digital image acquisition apparatus according to the present invention has considered common user behaviors, can be used for fast mode switching. The user can operate the apparatus, e.g. digital camera, without complicated steps. The operation time is reduced. Besides, the present invention can reduce the number of buttons in the digital image acquisition apparatus to further decrease manufacturing costs.

With the examples and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A mode switching method in a digital image acquisition apparatus, the digital image acquisition apparatus performing a picture taking function in responsive to a first action, and performing a mode switching function in responsive to a second action, the mode switching method comprising:
providing a plurality of snapshot modes and a viewing mode;
providing a snapshot parameter, for recording whether the digital image acquisition apparatus is currently utilized for taking pictures, wherein each time when the digital image acquisition apparatus is utilized for taking pictures in responsive to the first action, the snapshot parameter is recorded as a snapshot status; and
providing a mode parameter, for recording which mode the digital image acquisition apparatus is currently situated, wherein each time when the digital image acquisition apparatus is utilized for mode switching in responsive to the second action, the mode parameter is recorded as a corresponding mode status;
wherein when the digital image acquisition apparatus performs the mode switching function in responsive to the second action, if the snapshot parameter is recorded as the snapshot status, the digital image acquisition apparatus is switched directly to the viewing mode.

2. The mode switching method of claim 1, wherein the digital image acquisition apparatus comprises a first button for performing the picture taking function and a second button for performing the mode switching function, and the first action is to press the first button and the second action is to press the second button.

3. The mode switching method of claim 1, wherein when the digital image acquisition apparatus is in the viewing mode and the second button is actuated for mode switching, the digital image acquisition apparatus switches back to the previous snapshot mode according to the recorded mode status of the mode parameter after finishing viewing, and continues to take pictures in this original snapshot mode.

4. The mode switching method of claim 1, wherein the method further provides a setup mode, so as to enable the digital image acquisition apparatus to perform different setup functions.

5. The mode switching method of claim 1, wherein the snapshot mode comprises a single-snapshot mode, a burst-snapshot mode, and a self-snapshot mode.

6. The mode switching method of claim 1, wherein the mode status of the mode parameter is one of the following combination, the combination comprising: a single-snapshot status, a burst-snapshot status, a self-snapshot status, a viewing status and a setup status.

7. The mode switching method of claim 1, wherein when the digital image acquisition apparatus is power-on, the snapshot parameter is setup to an un-snapshot status.

8. The mode switching method of claim 7, wherein when the digital image acquisition apparatus performs mode switching via the second button, if the snapshot parameter is setup in the un-snapshot status, the digital image acquisition apparatus switches mode to another snapshot mode, and wherein when the digital image acquisition apparatus performs mode switching in all the snapshot modes, only if the snapshot parameter remains in the un-snapshot status, then the digital image acquisition apparatus finally switches to the viewing mode.

9. A digital image acquisition apparatus for fast mode switching, the digital image acquisition apparatus performing a picture taking function in responsive to a first action, and performing a mode switching function in responsive to a second action, the apparatus comprising:
an optical module, comprising at least one lens and one photoelectric device, to generate a digital image;
a memory module, for storing the digital image;
a display module, for displaying the digital image so as to enable a user to view the image;
a control module, for controlling the optical module, the memory module, and the display module, the control module also providing:
a plurality of snapshot modes and a viewing mode;
a snapshot parameter, for recording whether the digital image acquisition apparatus is currently utilized for taking pictures, wherein each time when the digital image acquisition apparatus is utilized for taking pictures in responsive to the first action, the snapshot parameter is recorded as a snapshot status; and
a mode parameter, for recording which mode the digital image acquisition apparatus is currently situated, wherein each time when the digital image acquisition apparatus is utilized for mode switching in responsive to the second action, the mode parameter is recorded as a corresponding mode status;
wherein, when the digital image acquisition apparatus performs the mode switching function in responsive to the second action, if the snapshot parameter is recorded as the snapshot status, the digital image acquisition apparatus is switched directly to the viewing mode.

10. The digital image acquisition apparatus of claim 9, wherein the digital image acquisition apparatus comprises a first button for performing the picture taking function and a second button for performing the mode switching function, and the first action is to press the first button and the second action is to press the second button.

11. The digital image acquisition apparatus of claim 9, wherein when the digital image acquisition apparatus is in the viewing mode and the second button is actuated for mode switching, the digital image acquisition apparatus switches back to the previous snapshot mode according to the recorded mode status of the mode parameter after finishing viewing, and continues to take pictures in this original snapshot mode.

12. The digital image acquisition apparatus of claim 9, wherein the method further provides a setup mode, so as to enable the digital image acquisition apparatus to perform different setup functions.

13. The digital image acquisition apparatus of claim 9, wherein the snapshot mode comprises a single-snapshot mode, a burst-snapshot mode, and a self-snapshot mode.

14. The digital image acquisition apparatus of claim 9, wherein the mode status of the mode parameter is one of the following combination, the combination comprising: a single-snapshot status, a burst-snapshot status, a self-snapshot status, a viewing status and a setup status.

15. The digital image acquisition apparatus of claim 9, wherein when the digital image acquisition apparatus is power-on, the snapshot parameter is setup to an un-snapshot status.

16. The digital image acquisition apparatus of claim 15, wherein when the digital image acquisition apparatus performs mode switching via the second button, if the snapshot parameter is setup in the un-snapshot status, the digital image acquisition apparatus switches mode to another snapshot mode, and wherein when the digital image acquisition apparatus performs mode switching in all the snapshot modes, only if the snapshot parameter remains in the un-snapshot status, then the digital image acquisition apparatus finally switches to the viewing mode.

17. The digital image acquisition apparatus of claim 9, wherein the apparatus also comprises a housing to accommodate the optical module, the memory module, the display module, and the control module, and the housing comprises a first button for taking pictures and a second button for mode switching.

* * * * *